United States Patent
Voser

(10) Patent No.: US 10,683,860 B2
(45) Date of Patent: Jun. 16, 2020

(54) PISTON COMPRESSOR VALVE AND METHOD FOR OPERATING A PISTON COMPRESSOR VALVE

(71) Applicant: BURCKHARDT COMPRESSION AG, Winterthur (CH)

(72) Inventor: Alexandre Voser, Elsau (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 16/499,068

(22) PCT Filed: Mar. 27, 2018

(86) PCT No.: PCT/EP2018/057839
§ 371 (c)(1),
(2) Date: Sep. 27, 2019

(87) PCT Pub. No.: WO2018/178117
PCT Pub. Date: Oct. 4, 2018

(65) Prior Publication Data
US 2020/0040883 A1 Feb. 6, 2020

(30) Foreign Application Priority Data

Mar. 27, 2017 (EP) ..................... 17163175

(51) Int. Cl.
*F04B 39/10* (2006.01)
*F04B 39/08* (2006.01)
(Continued)

(52) U.S. Cl.
CPC ............ *F04B 39/102* (2013.01); *F04B 39/08* (2013.01); *F16K 3/085* (2013.01); *F16K 3/10* (2013.01);
(Continued)

(58) Field of Classification Search
CPC .......... F04B 39/12; F04B 39/08; F16K 3/085; F16K 3/10; F16K 15/06; F16K 15/18;
(Continued)

(56) References Cited

U.S. PATENT DOCUMENTS 1,376,484 A * 5/1921 Tuttle ...................... F16K 15/08
137/512.15
1,614,124 A * 1/1927 Hansen ................... F16K 15/16
137/512.15
(Continued)

FOREIGN PATENT DOCUMENTS

DE 60103509 T2 6/2005
DE 112014005019 T5 8/2016
(Continued)

OTHER PUBLICATIONS

International Search Report PCT/EP2018/057839, dated Jul. 13, 2018, 4 pages including English Translation.
(Continued)

*Primary Examiner* — Marina A Tietjen
*Assistant Examiner* — Frederick D Soski
(74) *Attorney, Agent, or Firm* — Brooks Kushman P.C.

(57) ABSTRACT

A piston compressor valve including a valve seat having a plurality of through openings including a closing element which is rotatable about an axis of rotation (D) for opening and closing the through openings and having an actuating drive for rotating the closing element, wherein the valve seat has an end face into which the through openings lead, wherein the closing element is movably connected to the actuating drive in the running direction of the axis of rotation (D), such that the closing element is both rotatable about the axis of rotation (D) and also movable in the running direction of the axis of rotation (D) relative to the end face, and having a sensor for detecting a condition variable (E) of the
(Continued)

piston compressor valve, and having a control device which activates the actuating drive as a function of the condition variable (E).

17 Claims, 11 Drawing Sheets

(51) Int. Cl.
*F16K 3/08* (2006.01)
*F16K 3/10* (2006.01)
*F16K 15/06* (2006.01)
*F16K 15/18* (2006.01)

(52) U.S. Cl.
CPC .............. *F16K 15/06* (2013.01); *F16K 15/18* (2013.01); *Y10T 137/784* (2015.04); *Y10T 137/7839* (2015.04); *Y10T 137/7842* (2015.04); *Y10T 137/7843* (2015.04)

(58) Field of Classification Search
CPC ........... Y10T 137/7839; Y10T 137/784; Y10T 137/7842; Y10T 137/7843
See application file for complete search history.

(56) References Cited

U.S. PATENT DOCUMENTS

| | | | | |
|---|---|---|---|---|
| 1,627,680 | A * | 5/1927 | Vollmann | F16K 15/16 137/512.15 |
| 1,634,949 | A * | 7/1927 | Le Valley | F16K 15/16 137/512.15 |
| 2,553,645 | A * | 5/1951 | Ferro, Jr. | F16K 15/025 137/494 |
| 3,369,563 | A * | 2/1968 | Deminger | F16K 15/08 137/514 |
| 3,391,704 | A * | 7/1968 | Kremer, Jr. | F04B 39/1073 137/512.1 |
| 3,433,265 | A * | 3/1969 | Bartholet | F16K 3/085 137/625.18 |
| 4,231,394 | A * | 11/1980 | Hrabal | F01L 3/205 137/512 |
| 4,402,342 | A * | 9/1983 | Paget | F04B 39/1053 137/512.15 |
| 4,489,752 | A * | 12/1984 | Deminski | F16K 15/025 137/512.1 |
| 4,565,214 | A * | 1/1986 | Parman | F16K 15/148 137/512.15 |
| 4,565,507 | A * | 1/1986 | Reimers | F04B 39/1073 137/512.15 |
| 4,574,835 | A * | 3/1986 | Williams | F16K 15/10 137/512.15 |
| 4,924,906 | A * | 5/1990 | Hrabal | F04B 39/1033 137/512.1 |
| 4,951,706 | A * | 8/1990 | Kardos | F16K 15/10 137/512.1 |
| 5,052,434 | A * | 10/1991 | Bauer | F04B 39/1033 137/512.1 |
| 5,511,583 | A * | 4/1996 | Bassett | F04B 39/1033 137/512.1 |
| 5,634,492 | A * | 6/1997 | Steinruck | F04B 39/08 137/512.1 |
| 5,678,603 | A * | 10/1997 | Tschop | F04B 39/1033 137/512.1 |
| 6,164,936 | A * | 12/2000 | Djelouah | F04B 47/02 417/550 |
| 6,192,922 | B1 * | 2/2001 | MacGibbon | F16K 3/085 137/486 |
| 10,215,295 | B2 * | 2/2019 | Babbini | F04B 53/10 |
| 2001/0001477 | A1 | 5/2001 | Steinebrunner et al. | |
| 2001/0029981 | A1 * | 10/2001 | Penza | F04B 39/1033 137/516.23 |
| 2001/0039966 | A1 * | 11/2001 | Walpole | F04B 39/1053 137/512.1 |
| 2002/0002997 | A1 * | 1/2002 | Steinruck | F04B 39/1033 137/516.11 |
| 2003/0034075 | A1 * | 2/2003 | Stevenson | F16K 3/085 137/625.22 |
| 2003/0068245 | A1 * | 4/2003 | MacBain | F04B 39/1073 417/569 |
| 2004/0016459 | A1 * | 1/2004 | Thompson | F16K 17/082 137/512.1 |
| 2008/0156381 | A1 * | 7/2008 | Tuymer | F04B 39/1053 137/512.1 |
| 2010/0247359 | A1 | 9/2010 | Hauri et al. | |
| 2013/0220424 | A1 | 8/2013 | Oulman et al. | |
| 2013/0277119 | A1 * | 10/2013 | Rogers | E21B 21/10 175/317 |
| 2017/0023140 | A1 * | 1/2017 | Crump | F16H 7/08 |
| 2019/0264824 | A1 * | 8/2019 | Zonneveld | F16K 11/074 |

FOREIGN PATENT DOCUMENTS

| | | |
|---|---|---|
| EP | 0971160 A1 | 1/2000 |
| WO | 2001/59266 A1 | 8/2001 |
| WO | 2009/050215 A2 | 4/2009 |

OTHER PUBLICATIONS

International Search Report PCT/EP2018/057840, dated May 23, 2018, 6 pages including English Translation.

* cited by examiner

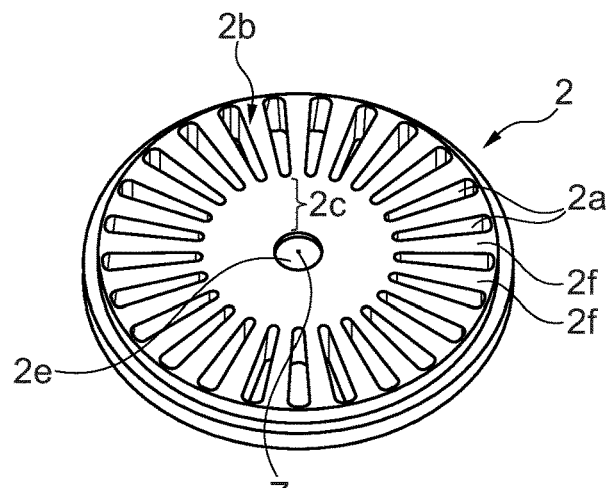
Fig. 3
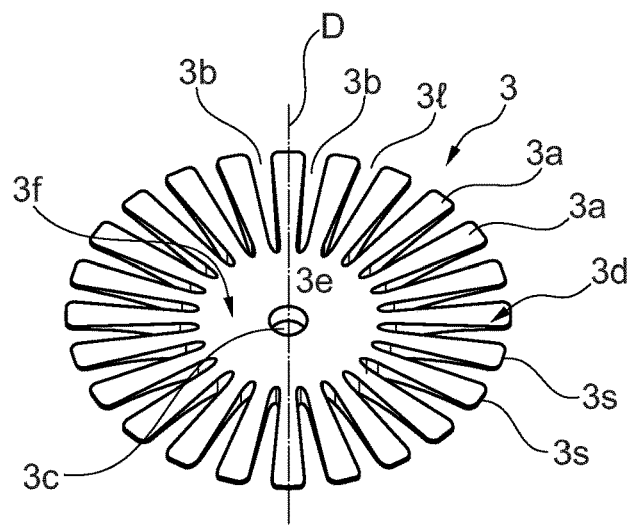
Fig. 4
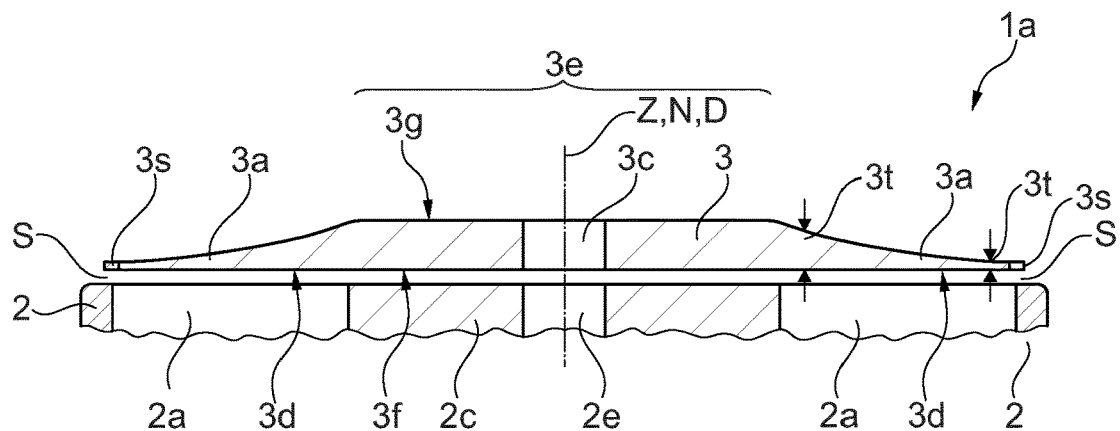
Fig. 5 (A-A)

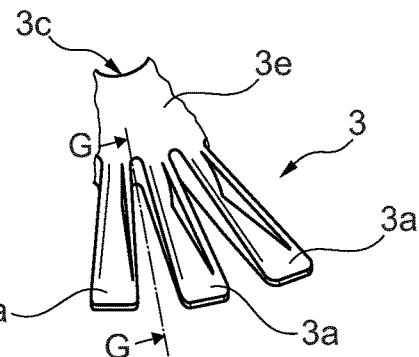
Fig. 20
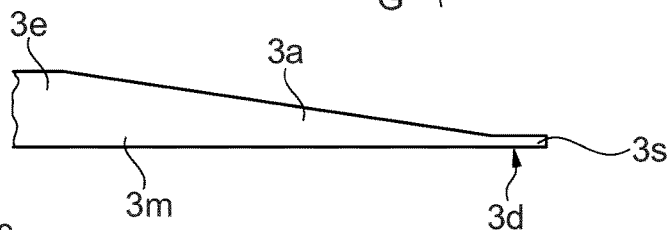
Fig. 21
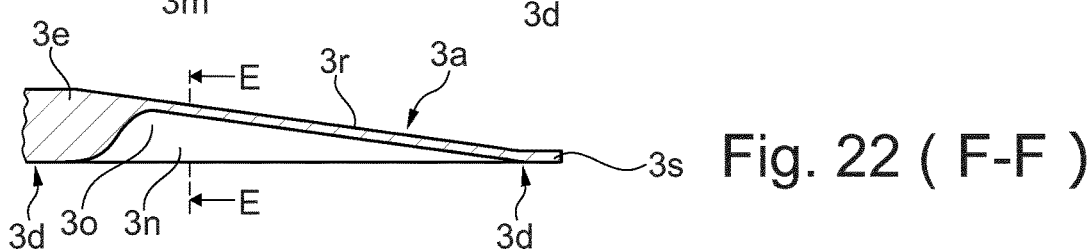
Fig. 22 ( F-F )
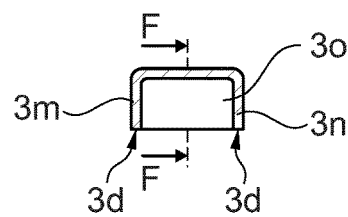
Fig. 23
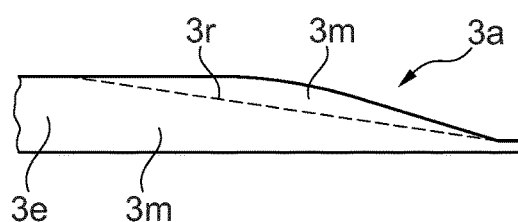
Fig. 24
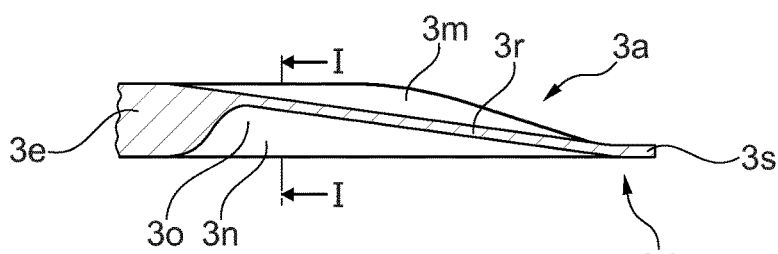
Fig. 25 ( H-H )
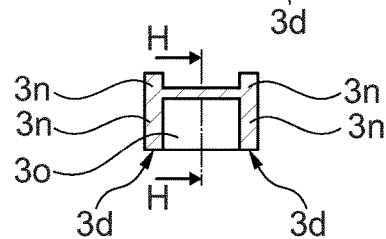
Fig. 26 ( I-I )

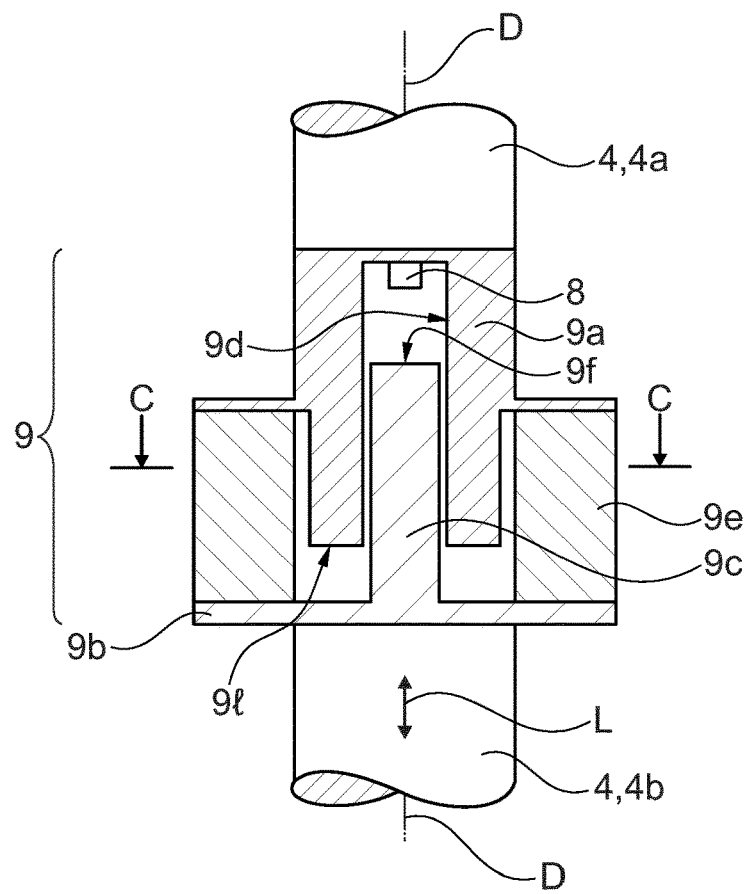
Fig. 27
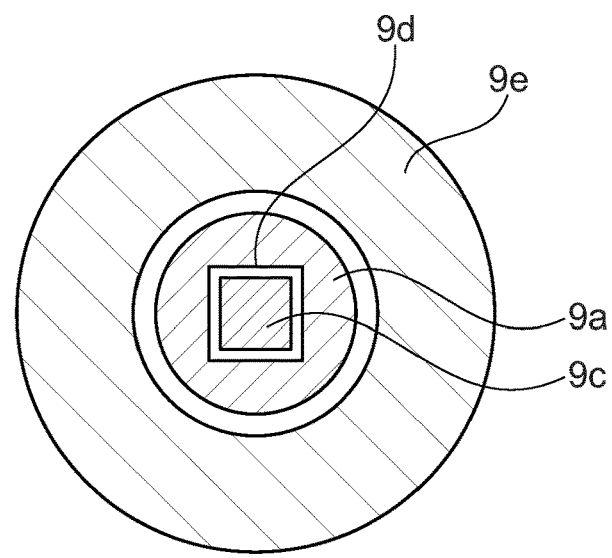
Fig. 28 (C-C)

PISTON COMPRESSOR VALVE AND METHOD FOR OPERATING A PISTON COMPRESSOR VALVE

CROSS-REFERENCE TO RELATED APPLICATION

This application is the U.S. national phase of PCT Application No. PCT/EP2018/057839 filed on Mar. 27, 2018, which claims priority to EP Patent Application No. 17163175.7 filed on Mar. 27, 2017, the disclosures of which are incorporated in their entirety by reference herein.

The invention relates to a piston compressor valve as claimed in the preamble of claim 1. The invention furthermore relates to a method for operating a piston compressor valve as claimed in the preamble of claim 13.

PRIOR ART

Document WO 01/59266A1 discloses a valve for a piston compressor. This valve comprises a valve seat and a rotatable closing element, wherein the closing element, as a function of the rotary position thereof, opens or closes passage openings that are disposed in the valve seat. This known valve has the disadvantages that relatively high wear arises, that opening and closing of the valve takes a relatively long time, and that the sealing function of the valve is reduced over time by virtue of the arising wear.

Document WO2009/050215A2 discloses a further valve for a piston compressor. This valve likewise has the disadvantages that wear arises, and that opening and closing of the valve takes a relatively long time.

SUMMARY OF THE INVENTION

It is an object of the invention to form a more advantageous piston compressor valve comprising a rotatable closing element.

This object is achieved by a piston compressor valve comprising the features of claim 1. Dependent claims 2 to 12 relate to further advantageous design embodiments. The object is furthermore achieved by a method for actuating a piston compressor valve, comprising the features of claim 13. Dependent claims 14 to 17 relate to further advantageous method steps.

The object is in particular achieved by a piston compressor valve, comprising a valve seat having a plurality of passage openings, comprising a closing element that for opening and closing the passage openings is rotatable about a rotation axis, and comprising an actuator drive for rotating the closing element, wherein the valve seat has an end side into which the passage openings open out, wherein the closing element is connected to the actuator drive so as to be movable in the profile direction of the rotation axis such that the closing element is rotatable about the rotation axis as well as displaceable in the profile direction of the rotation axis in relation to the end side, and comprising a sensor for detecting a state variable of the piston compressor valve, and comprising an actuator device which activates the actuator drive as a function of the state variable.

The object is furthermore particularly achieved by a piston compressor valve, comprising a valve seat having a plurality of passage openings, comprising a closing element that for opening and closing the passage openings is rotatable about a rotation axis, and comprising an actuator drive for rotating the closing element, wherein the valve seat has an end side into which the passage openings open out, wherein the closing element is designed so as to be integral, or in one part, respectively, wherein the closing element is fixedly connected to the rotation axis, wherein the closing element is connected to the actuator drive so as to be movable in a self-acting manner in the profile direction of the rotation axis such that the closing element by the actuator drive is rotatable about the rotation axis as well as displaceable in a self-acting manner in the profile direction of the rotation axis in relation to the end side, and comprising a sensor for detecting a state variable of the piston compressor valve, and comprising an actuator device which activates the actuator drive as a function of the state variable.

The object is furthermore particularly achieved by a method for actuating a piston compressor valve, wherein the piston compressor valve comprises a valve seat having at least one passage opening, a closing element that for opening and closing the passage openings is rotatable about a rotation axis, and an actuator drive for rotating the closing element, wherein the closing element is mounted so as to be displaceable in the profile direction of the rotation axis, wherein the closing element as a function of the pressure of an operating gas acting on the valve bears on the valve seat or is lifted from the valve seat, wherein a state variable of the piston compressor valve is measured, and wherein the closing element is rotated about the rotation axis as a function of the state variable.

The object is furthermore particularly achieved by a method for actuating a piston compressor valve, wherein the piston compressor valve comprises a valve seat having a plurality of passage openings, a closing element that for opening and closing the passage openings is rotatable about a rotation axis, and an actuator drive for rotating the closing element, wherein the closing element is designed so as to be integral, or in one part, respectively, and is fixedly connected to the rotation axis, wherein the rotation axis and therefore the closing element are displaceable in the profile direction of the rotation axis, wherein the closing element as a function of the pressure of an operating gas acting on the valve is displaced in a self-acting manner in the profile direction of the rotation axis and bears on the valve seat or is lifted from the valve seat, wherein a state variable of the piston compressor valve is measured, and wherein the closing element is rotated by the actuator drive about the rotation axis as a function of the state variable.

The piston compressor valve according to the invention has the advantage that the closing element thereof, in the case of a corresponding prevalent pressure differential, is lifted in a self-acting manner from the valve seat such that the closing element for completely opening the passage openings is advantageously only activated, or rotated by means actively acting thereon, respectively, when said closing element is lifted from the valve seat. On account thereof, the closing element when opening is not subjected to any or only very minor friction, this resulting in less wear on the closing element and the valve seat, on the one hand, and on the other hand enabling the closing element to be rotated by way of a minor force and in particular in a very rapid manner so as to on account thereof completely open the piston compressor valve. Moreover, the piston compressor valve is advantageously completely closed in such a manner that the closing element in the lifted state in relation to the valve seat is rotated from an open position to a closing position in which the passage openings, when viewed in the profile direction of the rotation axis, are completely covered by the closing element, and the closing element subsequently, or simultaneously, or by way of a minor temporal offset, by the prevalent pressure differential is moved in a self-acting manner toward the valve seat until the closing element bears on the valve seat and completely covers the passage openings such that the piston compressor valve is completely closed again such that the closing of the piston compressor valve by the closing element can also be performed very rapidly and without or with minor friction.

The closing element in the profile direction of the rotation axis is disposed in the piston compressor valve so as to be smoothly movable in such a manner that the closing element in the profile direction of the rotation axis is moved or displaced, respectively, in a self-acting manner by the pressure differential prevalent on the piston compressor valve between the region of the inlet and the region of the outlet, or the pressure differential prevalent on the closing element, respectively.

The piston compressor valve advantageously comprises a first rotation sub-axis, or a first sub-shaft, respectively, a second rotation sub-axis, or a second sub-shaft, respectively, and a coupling which is disposed between the first and the second rotation sub-axis such that the first and the second rotation sub-axis by virtue of the coupling are movable in a reciprocal manner, or displaceable in a reciprocal manner, respectively, in the profile direction of the rotation axis. The actuator drive is preferably connected to the first rotation sub-axis and the closing element is fixedly connected to the second rotation sub-axis. The coupling in relation to a rotation about the rotation axis is particularly advantageously designed so as to be rotationally stable such that the closing element when rotating about the rotation axis follows substantially or precisely rotation of the actuator drive. The coupling in the profile direction of the rotation axis is designed so as to be smoothly movable in such a manner that a pressure differential prevalent on the closing element moves or displaces, respectively, the latter in a self-acting manner in the profile direction of the rotation axis. On account thereof, a movement of the closing element in the profile direction of the rotation axis is guaranteed, on the one hand, and it is guaranteed, on the other hand, that the closing element by way of the rotation axis is preferably rigidly connected to the actuator drive which drives the rotation axis, this in turn enabling very rapid opening and closing of the closing element.

A plurality of variables are suitable as a state variable for detecting the state of the piston compressor valve, in particular for detecting the position of the closing element in relation to the valve seat, such as, for example, a movement, for example the distance of the closing element in the profile direction of the rotation axis, preferably the distance between the closing element and the end side of the valve seat, or a direct mutual physical contact between the closing element and the valve seat, for example, or an impact of the closing element or of the rotation axis in the case of a completely lifted closing element, or the pressure differential on both sides of the piston compressor valve closure, for example. An actuation device monitors the state variable, preferably compares the latter with a reference value, and opens or closes, respectively, the closing element by correspondingly rotating the closing element, or by activating an actuator drive that rotates the rotation axis, respectively, when a predefined condition is met. The piston compressor valve according to the invention is therefore capable of being switched in a precise, rapid, and repeatably identical manner.

The device according to the invention, or the method according to the invention, respectively, has the advantage that the lifting of the closing element from the valve seat is capable of being determined in an extremely precise manner, on the one hand because the closing element is movable in a self-acting manner in the profile direction of the rotation axis, and on the other hand because particularly preferably the movement of the closing element, or the distance between the closing element and the valve seat is measured in the profile direction of the rotation axis, respectively. The lifting of the closing element, or the point in time of lifting from the valve seat, respectively, can thus be precisely determined, and the actuator drive can subsequently be immediately activated in order for the closing element to be rotated to the open position. The closing element is preferably rotated from the closing position to the open position within a duration of at least 2 milliseconds to at most 10 milliseconds upon having been lifted from the valve seat by the actuator drive. It is ensured on account of the rapid opening that the fluid flowing therethrough is imparted a minor flow resistance. When closing, the closing element by the actuator drive is preferably rotated from the open position to the closing position within a duration of at least 2 milliseconds to at most 10 milliseconds, and the closing element is simultaneously, or upon rotating having been performed, lowered in a self-acting manner toward the valve seat until the closing element bears on the valve seat.

In one advantageous design embodiment, the closing element is connected to the actuator drive by way of a torsion spring, wherein part of the kinetic energy is stored in a torsion spring such that the closing element is capable of being switched in a particularly rapid manner.

The valve closure of the piston compressor valve, comprising the valve seat and the closing element, is preferably designed in such a manner that the valve seat has a center and a plurality of passage openings which are disposed so as to be spaced apart in the circumferential direction and run radially toward the center, and that the closing element has a plurality of radial arms and a rotation axis, wherein the arms run so as to be radial to the rotation axis, and wherein each passage opening is assigned one closing arm which is designed to be wide in such a manner that said closing arm can completely cover the passage opening in a closed position, and in an open position cover said passage opening to an ideally minor extent or not at all. The closing arms are designed in such a manner that said closing arms have a cross-sectional face that decreases toward the periphery, and on account thereof have a mass reducing toward the periphery in that the closing arms are designed so as to be thinner toward the periphery, for example. A closing element comprising closing arms of this type toward the periphery has a particularly minor mass and therefore has a reduced mass inertia, which is why minor forces are required in order to activate the closing element, that is to say to accelerate and decelerate, so as to switch the closing element back and forth between a closing position and an open position. The reduced mass inertia has the additional advantage that lower forces are required for accelerating the closing element in the profile direction of the rotation axis, or that the closing element can be moved more rapidly, or in a shorter time, respectively, in the profile direction of the rotation axis. The closing element is particularly preferably made from a plastics material and preferably comprises a fiber reinforcement, preferably carbon fibers, so that the closing element has a minor mass.

The closing element comprising a plurality of radial arms moreover has the advantage that the arms on the peripheries thereof are not mutually connected to one another such that each closing arm can place itself individually onto the passage opening so that each closing arm can better correct any irregularities or traces of wear that are potentially present on the passage opening or on the closing arm, in that each closing arm can bear individually on the valve seat. The cross-sectional face that decreases toward the periphery preferably has the result that the closing arm moreover has a reduced flexural rigidity toward the periphery, this resulting in the advantage that the closing arm can particularly readily adapt to the profile of the valve seat when the closing arm covers the passage opening, this resulting in particularly advantageous sealing.

In one advantageous design embodiment the valve closure for a piston compressor valve comprises a valve seat having a plurality of passage openings, a shaft having a rotation axis, and a closing element that for opening and closing the passage openings is rotatable about the rotation axis of the shaft, wherein the closing element is fixedly connected to the shaft, wherein the valve seat comprises a planar end side into which the passage openings open out, wherein the valve seat has a center, and wherein the passage openings run so as to be radial to the center, wherein the closing element has a center point and a plurality of closing arms that run so as to be radial to the center point, wherein the shaft is mounted in the valve seat in such a manner that the shaft is disposed so as to be rotatable about the rotation axis as well as displaceable in the profile direction of the rotation axis, wherein the rotation axis runs so as to be perpendicular to the end side and through the center, wherein each closing arm has a sealing face that is aligned toward the end side, and wherein the closing arms are configured so as to be substantially complementary to the passage openings so as to as a function of the rotation of the closing element close or open the passage openings by way of the sealing faces.

The shaft is preferably designed to be displaceable in the longitudinal direction of the rotation axis in such a manner that the closing element in the event of a corresponding prevalent pressure differential is displaceable in a self-acting manner in the longitudinal direction and is in particular capable of being lifted in a self-acting manner from the valve seat.

The closing arms are preferably designed in such a manner that said closing arms have a cross-sectional face that decreases towards the periphery of said closing arms.

In the case of one advantageous method for operating a valve closure of a piston compressor valve the valve closure comprises a valve seat having a plurality of passage openings, a shaft having a rotation axis, and a closing element that is fixedly connected to the shaft, wherein the shaft is mounted in the valve seat so as to be rotatable about the rotation axis and so as to be displaceable in the direction of the rotation axis, wherein the closing element for opening and closing the passage openings is rotated about the rotation axis, wherein the closing element by virtue of a fluid pressure prevalent on the piston compressor valve is lifted in a self-acting manner in the direction of the rotation axis, and wherein the closing element after lifting from the valve seat is rotated in a manner actively driven by the shaft and the passage openings are thus completely opened.

In one advantageous method in a first method step the closing element for opening the valve closure is lifted from the valve seat, and in a second method step the closing element after lifting is rotated to an open position.

In one advantageous method the position of the closing element in relation to the valve seat is measured, and the closing element is rotated about the rotation axis only upon having been lifted from the valve seat.

In one advantageous method the closing element is rotated to the open position within a duration of 2 milliseconds to 10 milliseconds upon having been lifted from the valve seat.

BRIEF DESCRIPTION OF THE DRAWINGS

In the drawings used for explaining the exemplary embodiments:

FIG. 3 shows a perspective view of a valve seat;

FIG. 4 shows a perspective view of a closing element which matches the valve seat according to FIG. 3;

FIG. 5 shows a longitudinal section along the section line A-A through the closing element and the valve seat according to FIG. 6;

FIG. 20 shows a perspective view of a fragment of a further exemplary embodiment of a closing element;

FIG. 21 shows a lateral view seen from the direction G-G of a radial closing part according to FIG. 20;

FIG. 22 shows a section along the section line F-F through the closing part according to FIG. 21;

FIG. 23 shows a section along the section line E-E through the closing part according to FIG. 21;

FIG. 24 shows a lateral view seen from the direction G-G of a further exemplary embodiment of a radial closing part;

FIG. 25 shows a section along the section line H-H through the closing part according to FIG. 24;

FIG. 26 shows a section along the section line I-I through the closing part according to FIG. 24;

FIG. 27 shows a longitudinal section through a further exemplary embodiment of a coupling device;

FIG. 28 shows a cross section along the section line C-C through the coupling device according to FIG. 23;

In principle, identical parts are provided with the same reference signs in the drawings.

PREFERRED EMBODIMENTS OF THE INVENTION

Figure 1:
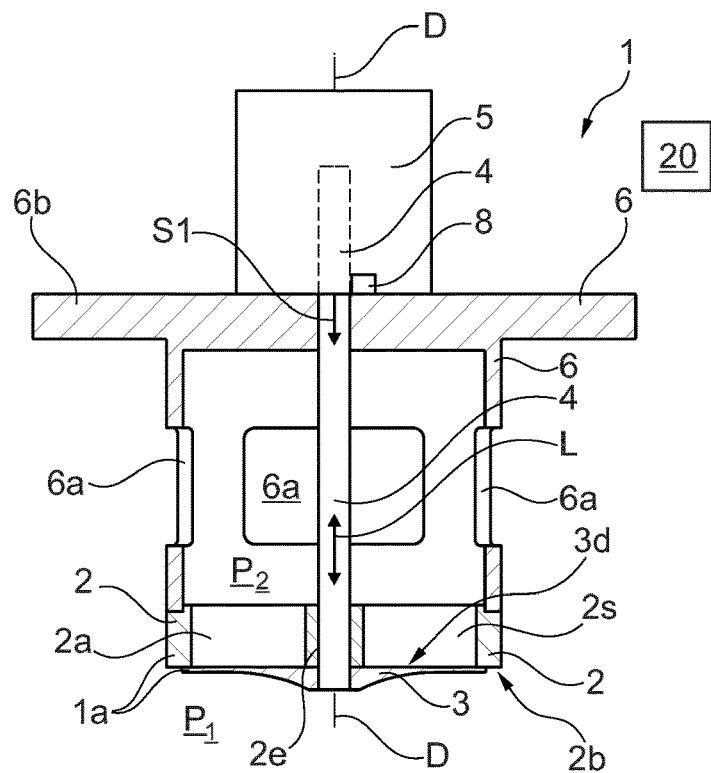
FIG. 1 shows a longitudinal section through a valve with a drive, having a closing element bearing thereon.

FIG. 1 shows an actively controlled piston compressor valve 1 comprising a valve seat 2 having a plurality of passage openings 2a, comprising a closing element 3 that for opening and closing the passage openings 2a is rotatable about a rotation axis D, and comprising an actuator drive 5 for rotating the closing element 3. The valve seat 2 has an end side 2b into which the passage openings 2a open out, wherein the closing element 3 is connected to the actuator drive 5 so as to be movable in the profile direction L of the rotation axis D such that the closing element 3 is rotatable about the rotation axis D as well as displaceable in the profile direction L of the rotation axis D in relation to the end side 2b. The shaft 4 is mounted in a bore 2e of the value seat 2 or is an axial guide bearing, respectively. The valve 1 is disposed in a bell housing 6 comprising passage openings 6a and a cover 6b. The closing element 3 is illustrated in a lowered closed position such that the closing element 3 bears on the end side 2b of the valve seat 2 and the passage openings 2a are completely closed by the closing element 3. The valve 1 illustrated in FIG. 1 moreover comprises a sensor 8 for detecting a state variable E of the closing element 3 or of the valve 1. The sensor 8 illustrated detects, for example, the movement of the shaft 4 in the profile direction L, for example, the stroke path of the shaft 4. An actuator device 20 detects the value measured by the sensor 8 and moreover actuates the actuator drive 5. The closing element 3 is rotated in the rotation direction of the rotation axis D, preferably from a close position to an open position or vice versa, by actuating the actuator device 20. In one advantageous design embodiment, the actuator device 20 activates the actuator drive 5 as soon as the state variable E deviates from a predefined nominal value. For example, the spacing between a sealing face 3d of the closing element 3 and the end side 2b of the valve seat 2, or a displacement path of the shaft 4 in the profile direction L, or a pressure differential $\Delta P = P2 - P1$, that is to say the difference between the pressure P2 on the one side of the closing element 3 and the pressure P1 on the other side of the closing element 3, is suitable as a state variable E. At least two sensors 8 are required for measuring the two pressures P1, P2. The shaft 4, in a way not illustrated in detail, is connected to the drive 5 in such a manner that the shaft 4 in terms of rotation about the rotation axis D is driven by the drive 5, on the one hand, and that the shaft 4 is displaceable in the longitudinal direction L in relation to the drive 5, on the other hand. The closing element 3 is particularly advantageously displaced in a self-acting manner in the profile direction L in that the pressure differential prevalent on the closing element 3 results in the closing element being displaced in the profile direction L and herein is either lifted from the valve seat 2 or approaches the valve seat 2 and ultimately bears on the end side 2b of the valve seat 2. In this preferred embodiment, the closing element 3 is mounted smoothly in such a manner that the closing element by virtue of the prevailing pressure differential can displace itself in a self-acting manner in the profile direction L. In a further potential design embodiment a drive (not illustrated) which at least partially facilitates the movement of the closing element 3 in the profile direction L could also be provided.

Figure 2:
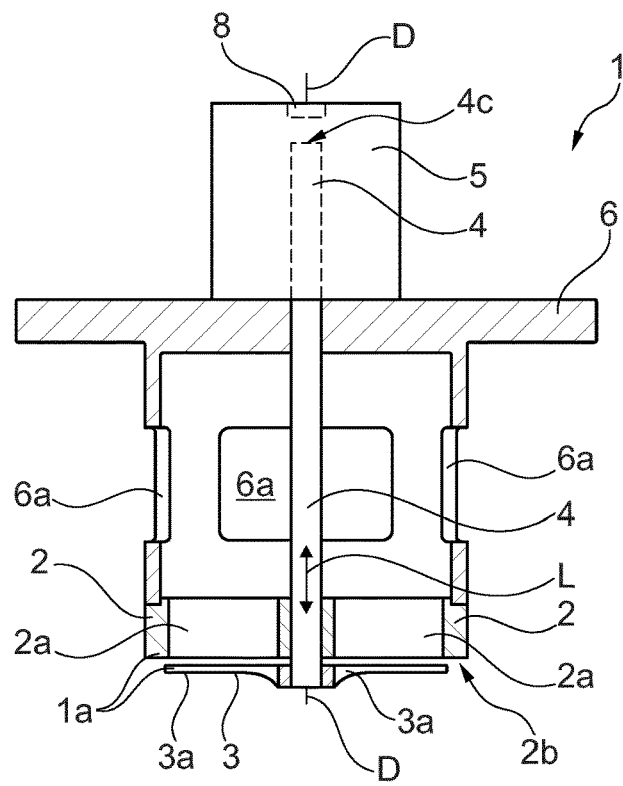
FIG. 2 shows a longitudinal section through the valve according to FIG. 1, having a lifted closing element.
Figure 7:
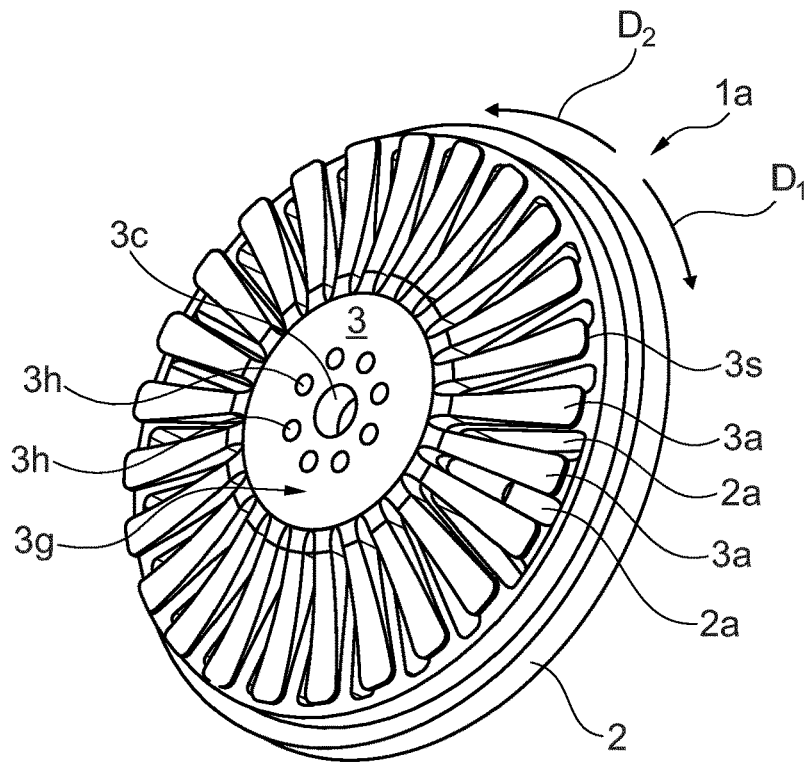
FIG. 7 shows a perspective view of the arrangement according to FIG. 6, having the closing element in the open position.

FIG. 2 shows the valve according to FIG. 1 having a closing element 3 in a lifted open position in which the closing element 3 in relation to the end side 2b is lifted in the longitudinal direction L. The closing element 3 in the lifted open position by way of the actuator drive 5 is moreover advantageously rotated about the rotation axis D in relation to the closed position illustrated in FIG. 1 in such a manner that the closing element 3 no longer covers the passage openings 2a, as illustrated in FIG. 2 and FIG. 7, and the valve closure 1a comprising the valve seat 2 and the closing element 3 is thus permeable to fluid in the longitudinal direction L. By contrast to the sensor 8 illustrated in FIG. 1, the sensor 8 illustrated in FIG. 2 measures the distance from the end side 4c of the shaft 4. The closing element 3 is fixedly connected to the rotation axis D, or to the shaft 4, respectively, such that the closing element 3 immediately follows a rotation about the rotation axis D and that the rotation axis D, or the shaft 4, respectively, immediately follows a movement of the closing element 3 in the longitudinal direction L.

FIG. 3 in a perspective view shows a first exemplary embodiment of a valve seat 2 having a central bore 2e, or a center Z, respectively, and having a multiplicity of passage openings 2a that run so as to be radially to the central bore 2e, having webs 2f running therebetween. The valve seat 2 moreover has an end side 2b into which all passage openings 2a open out, wherein the end side 2b in one advantageous design embodiment moreover also has an annular bearing face 2c. The valve seat 2 illustrated has twenty-five passage opening 2a which are disposed so as to be uniformly distributed, or identically mutually spaced apart, respectively, in the circumferential direction, wherein each passage opening 2a in one exemplary embodiment has a width of the circumferential angle of 7°, and wherein each web 2f has a width of the circumferential angle of 7.4°. In order for the closing element to be rotated from an open position to a closed position, or a closing position, respectively, or vice versa, said closing element thus has to be rotated by a rotation angle of 7.2°. The valve seat 2 advantageously comprises at least twenty passage openings 2a which are disposed so as to be spaced apart in the circumferential direction and a corresponding identical number of closing arms 3a which for opening and closing the passage openings 2a are disposed in a reciprocal manner and spaced apart in the circumferential direction. This design embodiment of at least twenty passage openings 2a and radial arms 3a has the same advantage in that the required maximum rotation angle of the closing element is relatively small and in the case of this exemplary embodiment is 360° divided by 20 (number of passage openings) divided by 2 (half the angle having to be rotated) and is thus 9°.

FIG. 4 shows a perspective view of closing element 3 that matches the valve seat 2 according to FIG. 3. The closing element 3 comprises a hub 3e having a central bore 3c and comprises a multiplicity of closing arms 3a which run so as to be radial to the central bore 3c, or to a rotation axis D, respectively, and which are mutually separated by intermediate spaces 3b which extend up to the periphery 3s. In one exemplary embodiment, each intermediate space 3b has a width of a circumferential angle of 7°, and each closing arm 3a has a width of a circumferential angle of 7.4° such that the closing arms 3a are designed so as to be slightly wider than the passage openings 2a such that the passage openings 2a in the case of a corresponding position of the closing element 3 are capable of being completely covered by the closing arms 3a. The closing element 3 is preferably designed so as to be integral, or in one part, respectively, that is to say so as to be composed of one part, and is advantageously made from a plastics material, for example from a fiber-reinforced plastics material, in particular a carbon-fiber-reinforced plastics material (CFP). A CFP is a composite material in which carbon fibers are embedded in a plastics material matrix, in most instances epoxy resin. The matrix material serves for connecting the fibers as well as fulfilling the intermediate spaces. Other durable plastics or thermosetting plastics are also suitable as a matrix material. However, the closing element can also be made from a plastics material without the addition of fibers.

Figure 6:
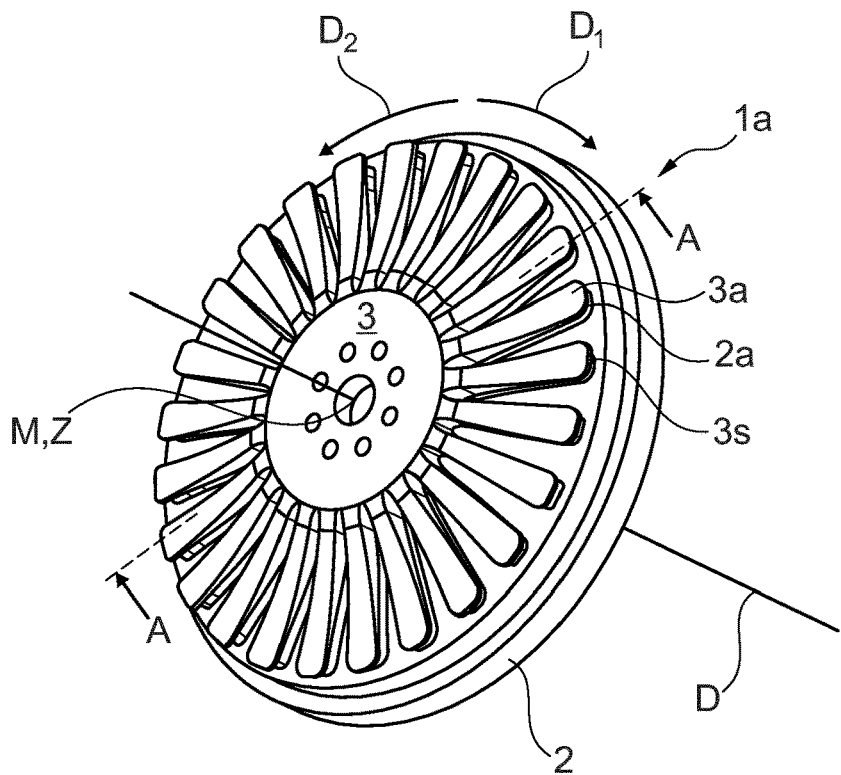
FIG. 6 shows a perspective view of the closing element and the valve seat having a lifted closing element.

FIGS. 6 and 7 show the actual valve closure 1a comprising the closing element 3 as well as the valve seat 2 in two potential reciprocal positions. FIG. 5 moreover shows a section through the closing element 3 and through the valve seat 2 as indicated along the section line A-A illustrated in FIG. 6. The valve closure 1a, that is to say the closing element 3 and the valve seat 2, can assume substantially four different reciprocal positions, specifically a lowered closed position, a lifted closed position, a lifted open position, and a lowered open position. Lifted means that the closing element 3 is lifted in relation to the valve seat 2 and thus is spaced apart therefrom, as is illustrated in FIGS. 2 and 5 to 7. Lowered means that the closing element 3 bears on the valve seat 2, as is illustrated in FIG. 1. The valve 1, or the valve closure 1a, respectively, is completely closed only in the lowered closed position illustrated in FIG. 1, in that the closing element 3 bears on the valve seat 2 and the passage openings 2a are completely closed by the closing element 3 bearing thereon, or the closing arms 3a of said closing element 3, respectively. In the case of the lifted closed position illustrated in FIGS. 5 and 6, the closing element 3 is spaced apart from the valve seat 2, wherein the closing element 3, or the closing arms 3a thereof, respectively, cover the passage openings 2a in a spaced-apart manner such that only a small gap S through which fluid flowing in or out could flow exists between the closing element 3 and the valve seat 2. In the case of the lifted open position illustrated in FIG. 7, the closing element 3 is spaced apart from the valve seat 2, wherein the closing element 3 has been rotated in the rotation direction D1 in comparison to the position according to FIG. 6 such that the passage openings 2a in the longitudinal direction L, or in the profile direction of the rotation axis D, respectively, are no longer covered by the closing element 3, or the closing arms 3a thereof, respectively, or if at all overlap to a minimum extent on the rim such that a largest possible area of the passage openings 2a in the longitudinal direction L is open to fluid flowing therethrough and the fluid flowing through the completely open valve closure 1a is not impeded by the closing element 3, or the radially running closing arms 3a thereof, respectively, or is impeded only to a negligible extent. Should the closing element 3 illustrated in FIG. 7 be lowered such that said closing element 3 would bear on the valve seat 2, the closing element 3 would thus assume a lowered open position in which the passage openings 2a are open to the maximum, preferably completely open, but at least open to the maximum, wherein the maximum opening area is determined by the width in the circumferential direction of a respective closing arm 3a and the width in the circumferential direction of a respective passage opening 2a. The closing element 3 is opened and thus moved to an open position by the actuator drive 5 by way of a rotation in the rotation direction D1, and is closed and thus moved to a closing position by a rotation in the rotation direction D2. Moreover, by virtue of the forces engaging on the closing element 3, in particular the pressure differential of the fluid, the closing element 3 moves in a self-acting manner in the longitudinal direction L such that the closing element 3 is in this direction lifted or lowered in relation to the valve seat 2. As is illustrated in FIG. 6, the rotation axis D runs through the center point M of the closing element 3, or through the center Z of the valve seat 2, respectively. FIG. 7 moreover shows that the closing element 3 has a fastening side 3g in which fastening bores 3h which serve for fastening the closing element 3 to the shaft 4 are disposed.

FIG. 5 shows a section along the section line A-A according to FIG. 6. The closing element 3 is lifted in relation to the valve seat 2. The closing element 3 comprises a hub 3e having a center point M, wherein the hub 3e comprises a central bore 3c, a planar friction face 3f, and a fastening side 3g. The closing arms 3a taper off toward the outside in the radial direction and therefore have a cross-sectional face that decreases toward the periphery 3s. The tapering results in the advantage that the mass of the closing arms 3a is reduced toward the outside, which reduces the weight and the mass inertia of the closing element 3. The height 3t of the closing arms 3a is reduced toward the periphery 3s in the exemplary embodiment according to FIG. 5. The closing arm 3a has a consistent height 3t in the circumferential direction D; this means that the closing arm 3a across the entire width thereof has the same height 3t.

In one exemplary method, the piston compressor valve 1 illustrated in FIGS. 1 and 2 can be operated in such a manner that a state variable E of the closing element 3, for example the displacement path Si of the shaft 4 in the longitudinal direction L, is measured, wherein the closing element 3, as is illustrated in FIG. 1, is initially disposed in the lowered closed position, wherein the shaft 4 is movable in a self-acting manner in the longitudinal direction L, and wherein the closing element 3 as a function of the pressure of an operating gas acting on the valve 1 or on the closing element 3, respectively, can be lifted from the valve seat 2. The state variable E is detected and the drive 5 is activated as soon as the state variable E exceeds a predefined nominal value such that the closing element 3 by way of the drive 5 is rotated to the lifted open position illustrated in FIG. 2 by a rotation about the rotation axis D, wherein the rotating takes place by way of the drive 5, and the lifting in the longitudinal direction L takes place in a self-acting manner. A travel signal of the sensor 8 is used as the state variable E, for example, in that the displacement of the shaft 4 in the direction of the longitudinal axis L is measured, wherein said displacement preferably corresponds to the spacing between the closing element 3 and the end side 2b. As soon as the state variable E exceeds a predefined nominal value, for example 0.1 mm, the drive 5 is activated and the closing element 3 rotated to the open position illustrated in FIG. 2 or FIG. 7.

Figure 8:
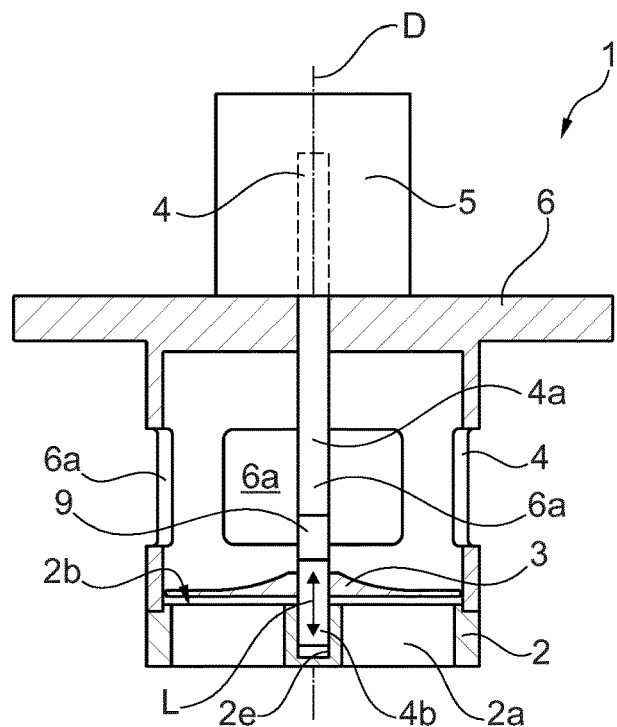
FIG. 8 shows a longitudinal section through a pressure valve having a lifted closing element.

FIG. 8 shows a valve 1 designed as a pressure valve, wherein the closing element 3 is situated in a lifted closed position. The closing element 3 is disposed between the valve seat 2 and the drive 5. By contrast thereto, the valve seat 2 in FIG. 2 is disposed between the closing element 3 and the drive 5. The valve according to FIG. 8 comprises a first shaft part 4a, or a first rotation sub-axis, respectively, and a second shaft part 4b, or a second rotation sub-axis, respectively, which are connected to one another by way of coupling 9. The first shaft part 4*a* is immovable in the longitudinal direction L, whereas the coupling 9 permits a movement in the longitudinal direction L such that the second shaft part 4*b* is movable in the longitudinal direction L. In the exemplary embodiment according to FIG. 8, the bore 2*e*, or the axial guide bearing, respectively, is designed as a pocket hole in which the second shaft part 4*b* is guided in a radial and axial manner. Otherwise, the components including valve seat 2, closing element 3, drive 5, and bell housing 6 have already been described in the context of FIGS. 1 and 2. In one further embodiment, the second shaft part 4*b* could be dispensed with in that the closing element 3 is connected directly to the coupling 9. The coupling 9 is preferably designed so as to be elastic or resilient in the longitudinal direction L in such a manner that the closing elements 3 by virtue of the engaging flow forces can move in a self-acting manner in the longitudinal direction L.

Figure 9:
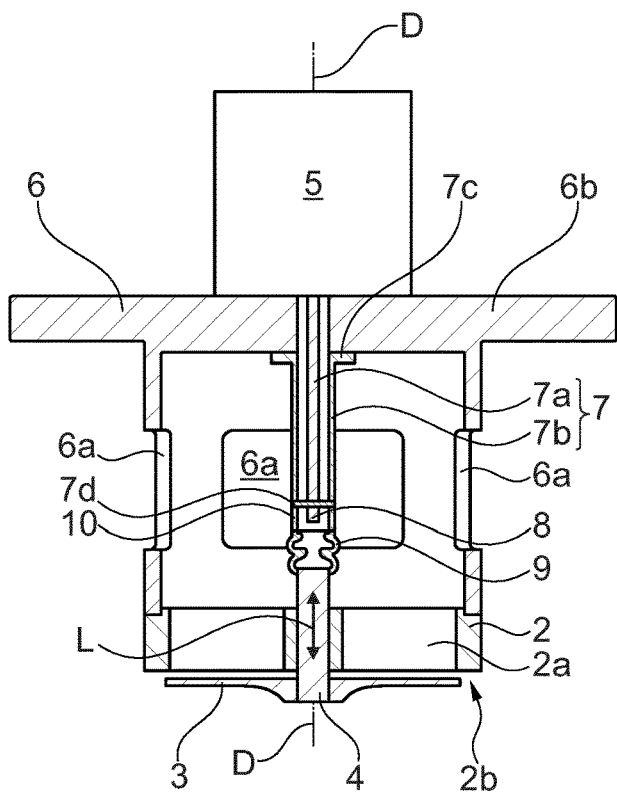
FIG. 9 shows a longitudinal section through a further exemplary embodiment of a suction valve, having a lifted closing element.

FIG. 9 shows a further valve 1 designed as a suction valve. By contrast to the valve 1 according to FIG. 2, the valve 1 according to FIG. 9 has a torsion spring 7 which comprises an inner torsion spring 7*a* as well as an outer hollow torsion bar 7*b*. The inner torsion spring 7*a* at the one end thereof is connected to the drive 5, and at the other end thereof is connected to a hollow torsion bar end 7*d* of the outer hollow torsion bar 7*b*. The hollow torsion bar 7*b* at one end is connected to the cover 6*b* by way of a fastening 7*c*, and at the other end is connected to the hollow bar end 7*d*. The hollow bar end 7*d* is connected to a hollow-cylindrical connection part 10 in which a sensor 8 is disposed. The connection part 10 is connected to the shaft 4 by way of the coupling 9. The coupling 9 is designed in such a manner that the coupling can vary the length thereof in the longitudinal direction L. The coupling is preferably designed so as to be elastic, preferably spring-elastic, in the longitudinal direction L. The shaft 4 on account of the coupling 9 is thus disposed so as to be movable in relation to the connection part 10, or the torsion spring 7, respectively, in the longitudinal direction L, or so as to be displaceable in the longitudinal direction L, respectively. The torsion spring 7 is designed so as to be immovable in the longitudinal direction L. The drive 5 causes a rotation of the inner torsion spring 7*a* out of position, and by way of the hollow bar end 7*d* moreover causes a rotation of the outer hollow torsion bar 7*b* out of position. Moreover, the connection part 10 and the coupling 9 and, on account thereof, the shaft 4 are rotated by rotating the hollow bar end 7*d*. The coupling 9 is configured in such a manner that said coupling 9 in the longitudinal direction L permits a change in length and preferably has a spring effect, and in particular elastic properties. The coupling 9 in terms of a rotation about the rotation axis D preferably has ideally rigid properties such that the closing element 3 and the shaft 4 by way of the coupling 9 are connected in a rotationally fixed manner to the connection part 10 and the hollow bar end 7*d*. The publication WO 2009/050215 A2 discloses a potential method for operating the valve in detail. The content of said publication is hereby incorporated in the present patent application.

Figure 10:
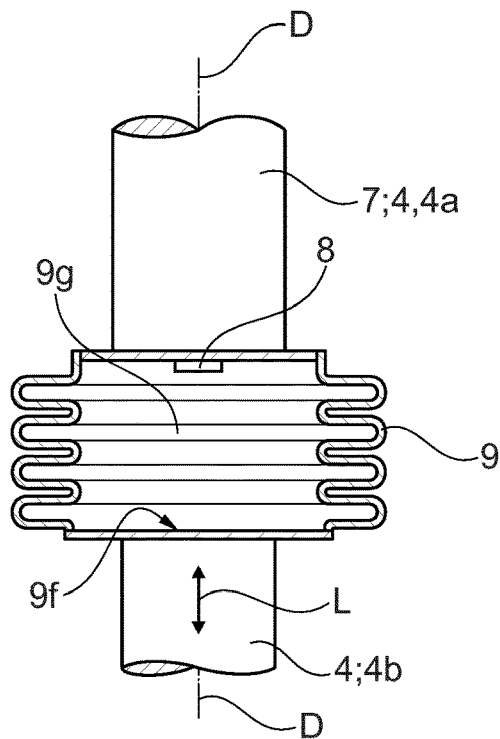
FIG. 10 shows a longitudinal section through a coupling device.

FIG. 10 shows a longitudinal section through a further exemplary embodiment of a connection between the torsion spring 7 and the shaft 4, wherein the connection is composed of the coupling part 9 which is movable, and in particular spring-elastic, in the longitudinal direction L. The coupling part 9 in terms of a rotation about the rotation axis D is designed so as to be preferably ideally rigid, preferably stable against rotating out of position. The coupling part 9 illustrated in FIG. 10 is designed as a bellows spring. The bellows spring 9 is preferably composed of metal so as to achieve a high torsional rigidity when rotating about the rotation axis D. The bellows spring 9 is designed in such a manner that said bellows spring 9 has elastic properties in the longitudinal direction L, wherein the elastic properties are capable of being determined, for example, by the war thickness of the bellows spring, the chosen material, preferably metal, as well as the geometric structure of the bellows spring. In one advantageous design embodiment, a sensor 8 is disposed in the interior space 9*g* which sensor 8 measures a distance in the longitudinal direction L, for example the distance from an end side 9*f* of the bellows spring 9 that is disposed opposite thereto. In one particularly advantageous design embodiment, the coupling part 9 configures an interior space 9*g* that is closed off in a gas-tight manner in relation to the exterior such that no contamination emanating from the outside can be deposited in the interior space 9*g*, so that the sensor 8 can measure the distance from the end side 9*f* in a long-term reliable and low-maintenance manner. The coupling 9 illustrated in FIG. 11 can also be used, for example, in a valve 1 as is illustrated in FIG. 1, 2, or 8, in that the continuous shaft 4 is subdivided into a first shaft part 4*a* and a second shaft part 4*b* and said two shaft parts 4*a*, 4*b* are connected to a coupling 9 as is described by way of FIG. 10 so that the shaft 4 illustrated in FIG. 1, 2, or 8 by virtue of the coupling 9 that is disposed on the shaft 4 has a resilient properties in the longitudinal direction L.

Figure 11:
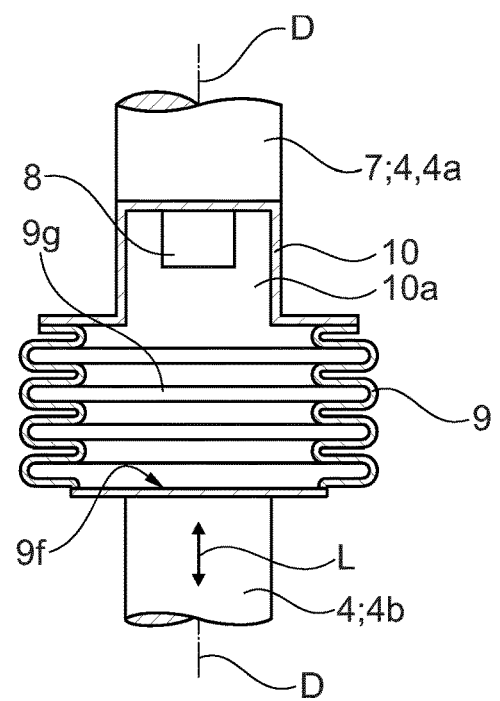
FIG. 11 shows a longitudinal section through a further exemplary embodiment of a coupling.
Figure 12:
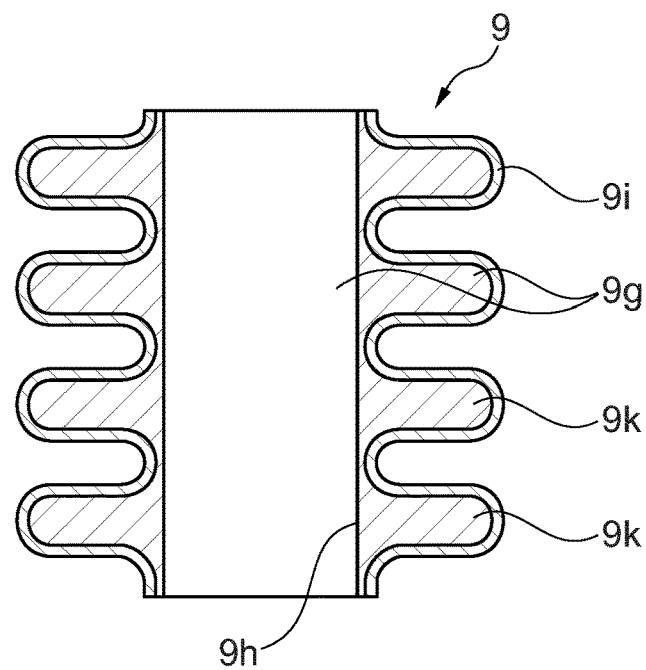
FIG. 12 shows a longitudinal section through a bellows spring.

FIG. 11 shows a longitudinal section through a further exemplary embodiment of a connection between the torsion spring 7 and the shaft 4 wherein the connection comprises a combination of a hollow-cylindrical connection part 10 and a coupling part 9, wherein the coupling part 9 is designed as a bellows spring as is described in FIG. 10 or 12. In one advantageous design embodiment a sensor 8 is disposed in the connection part 10 which sensor 8 measures the distance from an end side 9*f* of the bellows spring 9 that is disposed opposite thereto, for example. In one particularly advantageous design embodiment the connection part 10 as well is the coupling part 9 designed as the bellows spring 9 configure a common interior space 9*g* that is closed off in a gas-tight manner in relation to the exterior. The arrangement illustrated in FIG. 11, comprising the connection part 10 as well as the bellows spring 9, can also be used, for example, in a valve 1 as is illustrated in FIG. 1, 2, or 8. An eddy current sensor is suitable as the sensor 8, for example.

FIG. 12 shows a further exemplary embodiment of a coupling 9, comprising a bellows-shaped, preferably metallic, external casing 9*i* having bellows-shaped convexities 9*k* and an interior space 9*g* which is partially filled with an elastic filler material (illustrated in hatched lines) such that an open, cylindrical internal cavity 9*h* still remains, for example. The elastic filler material serves for determining the spring rate, or the spring elastic, respectively, of the coupling 9 in the longitudinal direction L, wherein said spring rate is determined in particular by the elasticity of the filler material and/or the disposal of the filler material in the bellows-shaped convexities 9*k* of the external casing 9*i*. The elastic filler material is preferably composed of an elastic plastics material. The elastic filler material is disposed in the internal cavity 9*h*, wherein at least some of the bellows-shaped convexities 9*k*, and preferably all convexities 9*k*, as illustrated, are preferably completely filled with the elastic filler material 9*g*. In order for the closing element 3 to be moved in a reliable and self-acting manner in the longitudinal direction L, the coupling requires a spring rate which is correspondingly adapted to the forces that in the longitudinal direction L engage on the closing element 3. The coupling parts 9 illustrated in FIGS. 10 to 12 can be produced in a multiplicity of different spring rates, depending on the requirement.

Figure 13:
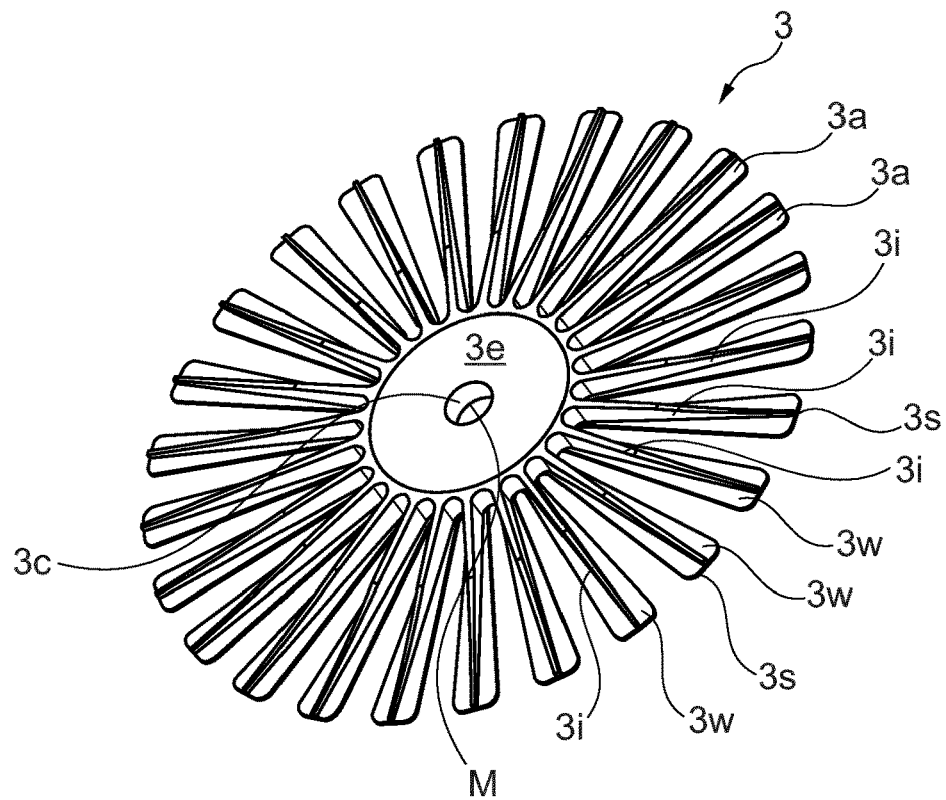
FIG. 13 shows a perspective view of a further exemplary embodiment of a closing element.

FIG. 13 shows a perspective plan view of a further exemplary embodiment of a closing element 3. The lower side of the closing element 3 could be designed as is illustrated in FIG. 4. The closing element 3 comprises a hub 3e having a central bore 3c, a center point M, and a plurality of closing parts 3a that run so as to be radial to the center point M and are mutually spaced apart in the circumferential direction. Each radial arm 3a is composed of a plate-shaped part 3w and a rib 3i that is fixedly connected thereto, wherein each plate-shaped part 3w in the radial direction extends up to the periphery 3s. Each rib 3i on the side that faces away from the passage opening 2a projects beyond the plate-shaped part 3w in the direction of the rotation axis D. The rib 3i has a height 3t that decreases toward the periphery 3s and, on account thereof, a decreasing cross-sectional face. The flexural rigidity of the closing parts 3a depends in particular on the design embodiment of the projecting rib 3i. The height 3t of the rib 3i is advantageously reduced in the radial direction toward the outside so as to reduce the mass of the rib 3i toward the outside and so as to in particular reduce the mass of the closing element 3 in a radially outward manner so as to on account thereof reduce the mass inertia of the closing element 3 in particular in relation to a rotating movement about the rotation axis D.

Figure 14:
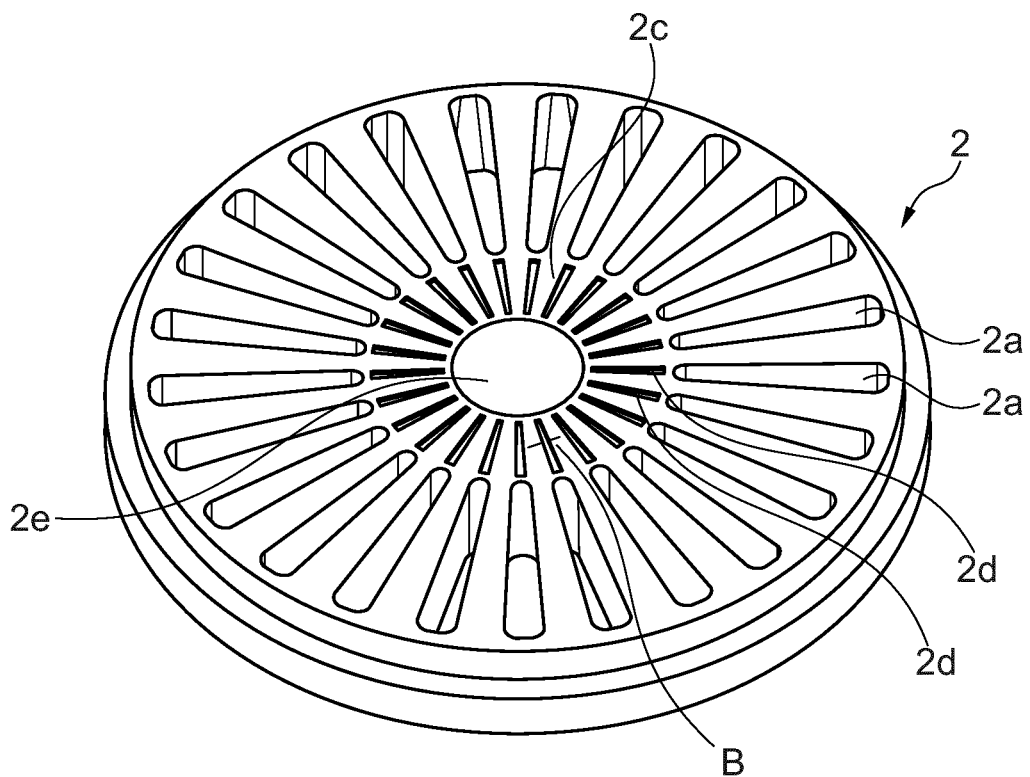
FIG. 14 shows a perspective view of a further embodiment of a valve seat.
Figure 15:
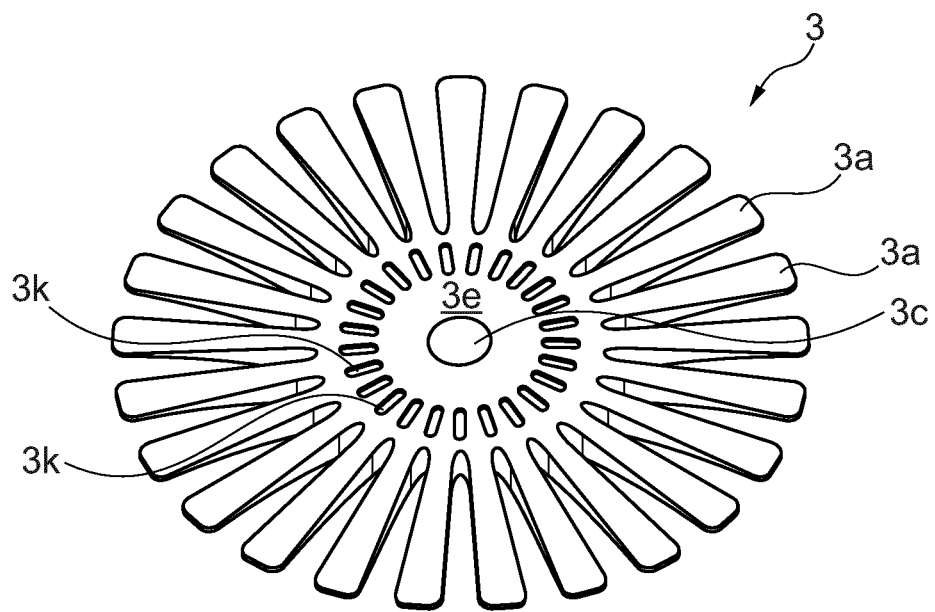
FIG. 15 shows a perspective view of the closing element associated with the valve seat according to FIG. 14.
Figure 16:
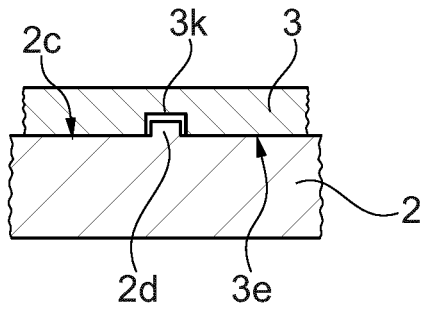
FIG. 16 shows a view of a detail of a section along the section line B of the valve according to FIG. 14 in the closed state.
Figure 17:
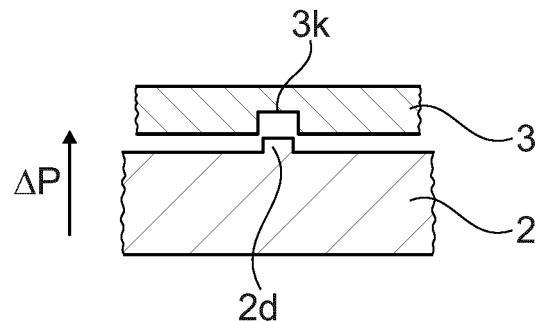
FIG. 17 shows the view according to FIG. 16 in the case of a lifted closing element.
Figure 18:
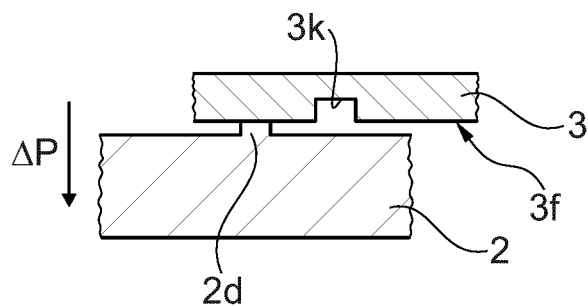
FIG. 18 shows the view according to FIG. 16 in the case of a lifted closing element that is slightly rotated out of position.

FIG. 14 shows a perspective plan view of a valve seat 2 which by contrast to the embodiment illustrated in FIG. 3 has support elements 2d which on the annular face 2c protrude in the direction of the rotation axis D and in the circumferential direction are mutually spaced apart, preferably uniformly mutually spaced apart, and which run so as to be radial in relation to the bore 2e. FIG. 15 shows a perspective view of a closing element 3 which by contrast to the embodiment illustrated in FIG. 4 in the surface of the hub 3e has depressions 3k which run so as to be radial to the central bore 3c and are disposed in a reciprocal manner to the support elements 2d. The valve seat 2 according to FIG. 14 and the closing element 3 according to FIG. 15 are designed so as to be mutually adapted in such a manner that the same number of projecting support elements 2d and depressions 3k are disposed in such a manner that one opposite depression 3k is provided for each support element 2d and the respective support element 2d can engage in the opposite depression 3k. FIGS. 16 to 18 in a section along the section line B according to FIG. 14 show the valve seat 2 and the closing element 3 in various positions. In FIG. 16, the closing element 3 has a lowered closed position, wherein the closing element 3 bears on the valve seat 2, and wherein each support element 2d engages in the depression 3k disposed opposite thereto, wherein the projecting support element 2d is completely accommodated in the depression 3k such that the bearing face 2c bears in a planar manner on the hub 3e. In the case of FIG. 17, an upwardly directed positive pressure differential ΔP is prevalent on the closing element 3 which results in that the closing element 3 in relation to FIG. 16 is lifted in the longitudinal direction L such that the closing element 3 is situated in a lifted closed position in which the closing element 3 is lifted but has not yet been rotated out of position about the rotation axis D in relation to the position according to FIG. 16. As soon as the closing element 3 is situated in the position illustrated in FIG. 17, the closing element 3 can be rotated about the rotation axis D. FIG. 18 shows the closing element 3 in a lifted position in which the closing element 3 in relation to FIG. 16 is lifted in the longitudinal direction L, and the closing element 3 is rotated out of position in the rotation direction of the rotation axis D. FIG. 18 shows a situation in which a downwardly directed negative pressure differential ΔP is prevalent on the closing element 3 which results in that the closing element 3 is urged to be lowered in the direction of the valve seat 2, this however being prevented by the support element 2d on which the closing element 3 bears. The end face of the support element 2d that bears on the closing element 3 is comparatively small, this resulting in the advantage that the rotation force which is required for rotating the closing element 3 in the rotation direction D2 of the rotation axis D is relatively small. The support element 2d thus has the advantage that the resistance to rotation between the closing element 3 and the valve seat 2 is reduced in comparison to an embodiment without a support element 2d, so that the closing element 3 can still be reliably rotated even when, as illustrated, a negative pressure differential ΔP is prevalent on the closing element 3, said pressure differential ΔP urging the closing element 3 against the valve seat 2. The valve 1 according to the invention can therefore be reliably operated in a larger range of prevailing pressure differentials. The support element 2d has the further advantage that the wear on the closing element 3 and the valve seat 2 is moreover reduced in the case of a negative pressure differential ΔP should said closing element 3 and said valve seat 2 be mutually rotated out of position in the case of a negative pressure differential ΔP.

In a further exemplary embodiment, depressions instead of support elements 2d can be disposed on the valve seat 2, and in a reciprocal manner support elements instead of depressions 3k could be disposed in the closing element 3.

Figure 19:
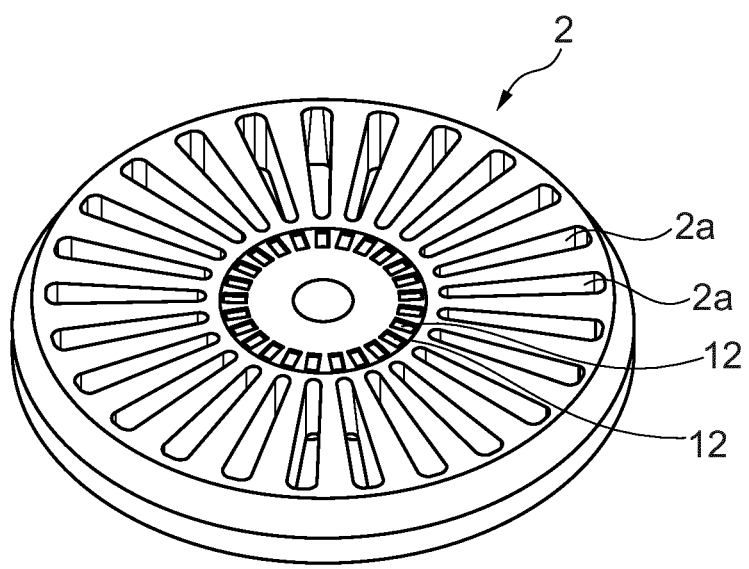
FIG. 19 shows a perspective view of a further exemplary embodiment of a valve seat.

FIG. 19 shows a further exemplary embodiment of a valve seat 2 which by contrast to the embodiment illustrated in FIG. 3 has a plurality of rolling members 12 that are spaced apart in the circumferential direction in the annular phase 2c. Said rolling members 12 project slightly beyond the annular face 2c, for example by ¹⁄₁₀ mm. The rolling members 12 serve for reducing the sliding resistance or rolling resistance, respectively, of the rotating closing element 3 that bears on the valve seat 2, or on the annular bearing face 2c, respectively. The rolling members 12 are preferably designed so as to be cylindrical or conical and are preferably composed of metal or ceramics.

FIG. 20 in fragments shows a further exemplary embodiment of a closing element 3, comprising a hub 3e having a central bore 3c, and comprising a plurality of radial closing parts 3a that are disposed so as to be mutually spaced apart in the circumferential direction and are connected to the hub 3e. FIG. 21 shows a lateral view of a single closing part 3a according to FIG. 20, seen from the direction G. FIG. 22 shows a longitudinal section F-F of the closing part 3a, and FIG. 23 shows a cross section of the closing part 3a along the section line E-E. The closing part 3a comprises a first and a second radial lateral wall 3m, 3n, and a cover phase 3r, which limit an interior space 3o. The first and the second radial lateral wall 3m, 3n run in such a manner that said lateral walls 3m, 3n moreover configure in each case one planar sealing face 3d which is aligned toward the valve seat 2, as is illustrated in FIG. 23. Said two sealing faces 3d, conjointly with the sealing face 3d that is disposed on the hub 3e and the sealing face 3d that is disposed in the region of the periphery 3s of the closing part 3a, can bear on the end side 2b of a valve seat 2, as is illustrated in FIG. 22, and sealed the passage openings 2a, for example in the case of the valve seat 2 according to FIG. 3, in that the mentioned sealing faces 3d bear on the end side 2b. The closing element 3 in the lowered closed position bears on the valve seat 2, wherein the closing element 3 in relation to the valve seat 2 is disposed in such a manner that the sealing faces 3*d* bear on the end side 2*b* and enclose the passage opening 2*a*, wherein the spoon-shaped interior space 3*o* of the closing part 3*a* herein lies above the passage opening 2*a*, being fluidically connected thereto. The closing element 3 illustrated in FIGS. 20 to 23 has the advantage that the radial closing parts 3*a*, in particular by virtue of the lateral walls 3*m*, 3*n*, in the case of a corresponding choice of material have a high rigidity and that the radial closing parts 3*a* can on the other hand be designed so as to be light in mass, which in the case of a rotation of the closing element 3 about the rotation axis D results in the advantage that said closing element 3 has a reduced inert mass. On account thereof, a lower effort in terms of force is required for rotating the closing element 3 about the rotation axis D, more specifically during the acceleration phase and during the deceleration phase, for moving the closing element 3 from an open position to a closed position and vice versa from a close position to an open position.

FIG. 24 shows a lateral view of a further exemplary embodiment of a single closing part 3*a*, again seen from the direction G. FIG. 25 shows a longitudinal section of the closing part 3*a* according to FIG. 24 along the section line H-H, and FIG. 26 shows a cross section of the closing part 3*a* along the section line I-I. The closing part 3*a* again comprises a first and a second radial lateral wall 3*m*, 3*n*, and a cover face 3*r*, wherein the radial lateral walls 3*m*, 3*n* by contrast to the exemplary embodiment according to FIGS. 21 to 23 are designed so as to be wider and project beyond the cover phase 3*r*, as is illustrated in FIGS. 24 to 26. Said lateral walls 3*m*, 3*n* that are wider in the profile direction of the rotation axis D result in the advantage that the radial closing part 3*a* in the case of an identical wall thickness of the lateral walls 3*m*, 3*n* has either a high stability or a higher flexural rigidity, respectively, or that the lateral walls 3*m*, 3*n* are designed so as to be thinner, and the closing part 3*a* thus has a lower mass. All closing parts 3*a* of one closing element 3 are advantageously designed in an identical manner.

FIG. 27 shows a longitudinal section through a further exemplary embodiment of the coupling 9 which is an alternative to the coupling 9 according to FIGS. 10 and 11. FIG. 28 shows a section of the coupling according to FIG. 27 along the section line C-C. As has already been described in the context of FIGS. 10 and 11, the coupling 9 illustrated in FIGS. 27 and 28 also has a mobility in the longitudinal direction L, whereas the coupling 9 is rigid against rotation out of position in relation to a rotation about the rotation axis D. The coupling 9 comprises a first coupling part 9*a* which is fixedly connected to the first shaft part 4*a*, and comprises a second coupling part 9*b* which is fixedly connected to the second shaft part 4*b*. The first coupling part 9*a* comprises an angular recess 9*d*, and the second coupling part 9*b* comprises an angular appendage 9*c*, wherein the recess 9*d* and the appendage 9*c* are designed so as to be mutually adapted in such a manner that a reciprocal movement in the longitudinal direction L is possible, wherein a reciprocal rotation out of position about the rotation axis D is barely or not at all possible. The first and the second coupling part 9*a*, 9*b* are connected to one another in a spring-elastic manner by way of an elastic spring part 9*e* such that the first and the second coupling part 9*a*, 9*b* can carry out a reciprocal movement in the longitudinal direction L. The spring part 9*e* can be designed so as to be hollow-cylindrical, as illustrated, and be composed of a plastics material, for example. In one advantageous design embodiment, a sensor 8 which measures the distance, or the variation in distance, respectively, between the two coupling parts 9*a*, 9*b* in that the distance between the sensor 8 and the end side 9*f* is measured, for example, is disposed as illustrated within the coupling 9. In one advantageous design embodiment, the coupling 9 has a detent 9*l* which delimits the maximum stroke path of the coupling 9. The elasticity of the spring part 9*e* is preferably chosen in such a manner that the closing element 3 can move in a self-acting manner in the longitudinal direction L.

Figure 29:
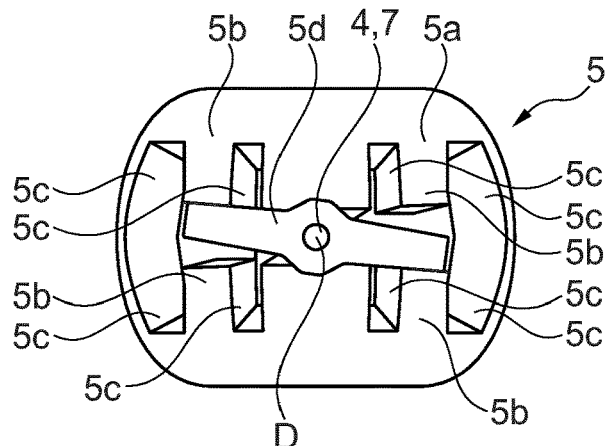
FIG. 29 shows a view of a detail of an electromagnetic drive.
Figure 30:
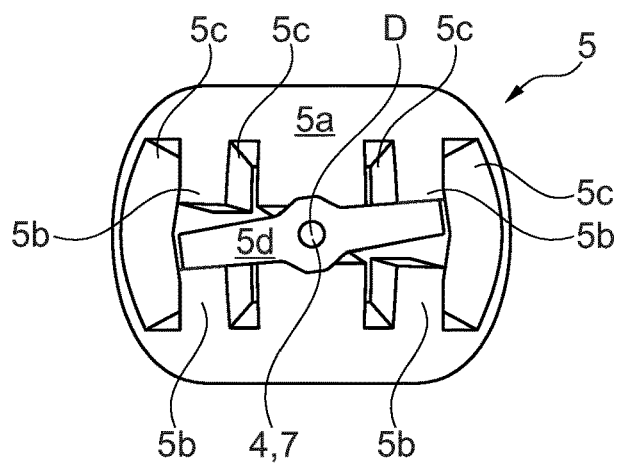
FIG. 30 shows the electromagnetic drive according to FIG. 29 having the armature in a second basic position.

FIG. 29 shows an electromagnetic drive 5 in a first basic position, and FIG. 30 shows the same electromagnetic drive 5 in a second basic position. The drive 5 comprises a stator 5*a* having four yokes 5*b* and interior spaces 5*c* for coils. The electrically conducting coils for generating the magnetic field that are wound about each of the four yokes 5*b* and run in the interior space 5*c* are not illustrated. The drive 5 moreover comprises an armature 5*d* which is preferably fixedly connected to the shaft 4 or to the torsion spring 7 and which is mounted so as to be pivotable about the rotation axis D. The drive 5 is designed in such a manner that the maximum pivoting range of the armature 5*d* is slightly larger than the angle required for rotating the closing element 3. Depending on the design embodiment in terms of construction, the drive 5 preferably has a pivot angle in a range from 5° to 20°. Rotating the closing element 3 from the open position to the closed position by 7.2° means that the open position conjointly with the close position in the circumferential direction in total occupy a rotation angle of in total 14.4° such that the valve seat 2 has twenty-five passage openings 2*a* that in the circumferential direction are uniformly mutually spaced apart, as is illustrated in FIG. 3. Accordingly, the armature 5*d* of the drive 5 would have to pivot about a slightly larger angle, for example about an angle in the range from 8° to 10°, in particular depending on the rigidity of the first shaft part 4*a* against rotation out of position. The valve seat 2 illustrated in FIG. 3 has the advantage that a small rotation angle is required from the open position to the closed position, this enabling particularly rapid switching, or a particularly short switching time, respectively. The drive 5 illustrated in FIGS. 29 to 31 is suitable for rotating the closing element 5 as is shown in FIGS. 1, 2, 8, and 9, about an angular range of, for example, 7.2°, so as to drive the closing element 5 and rotate the latter from the open position to the close position, or vice versa.

Figure 31:
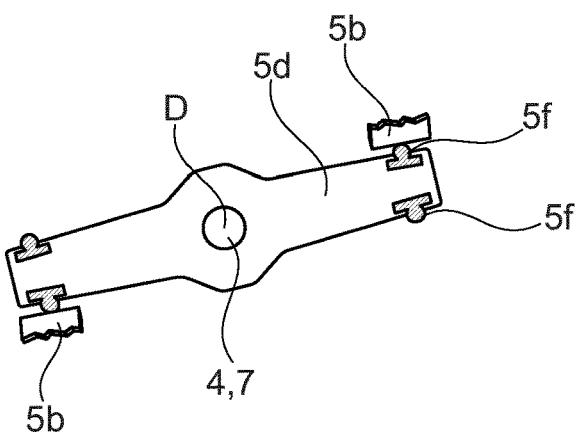
FIG. 31 shows a further exemplary embodiment of the electromagnetic drive.

In one particularly advantageous design embodiment, as is illustrated in FIG. 31, damper elements 5*f* are disposed on the end portions of the armature 5*d*, the task of said damper elements 5*f* being to prevent direct contact between the armature 5*d* and the yoke 5*b*. The damper elements 5*f* are composed of a non-magnetic material, for example aluminum, or a plastics material. This design embodiment has an advantage that sticking of the armature 5*d* on the yoke 5*b* is prevented such that it is ensured that the armature 5*b* is immediately released from the yoke 5*b* when a corresponding magnetic field for switching the armature 5*d* is applied to the drive 5. The piston compressor valve 1 illustrated in FIGS. 1, 2, 8, 9, comprising a drive 5 is illustrated in FIGS. 29 to 31, can be very rapidly switched from a closed position to an open position and vice versa, wherein the switching time is less than 0.1 second, and particularly advantageously lies in the range of approximately 2.5 milliseconds, or lies in the range between 2 to 10 milliseconds.

It is not necessary for the rotation angle of the closing element 3 to be detected as a state variable E of the closing element 3, since no indication pertaining to the displacement of the closing element 3 in the longitudinal direction L can be derived from said state variable, and thus based on said state variable no decision can be made as to the point in time at which the actuator drive 5 is to be activated. However, with a view to the reliable operation of the piston compressor valve it can prove advantageous for the rotation angle of the closing element 3, or a variable associated therewith, in particular the rotation angle of the actuator drive 5, to also be additionally measured. Moreover, it is advantageous for the crankshaft angle of the compressor to be measured. By way of the crankshaft angle of the compressor it can be determined when, or at which crankshaft angle, respectively, the piston compressor valve has to be opened or closed, respectively, or at which crankshaft angle the exhaustion of gas, or the induction of gas, respectively, of the piston compressor valve takes place. Malfunctions of the closing element 3 can be detected by measuring the rotation angle of the closing element 3, for example, and error signals can be generated, or the piston compressor can be stopped in an emergency, for example, should the closing elements 3 not be opened and closed by the rotation of the closing element 3 in a cycle predefined by the crankshaft angle.

The invention claimed is:

1. A piston compressor valve comprising a valve seat having a plurality of passage openings, comprising a closing element for opening and closing the passage openings is rotatable about a rotation axis (D), and comprising an actuator drive for rotating the closing element, wherein the valve seat has an end side into which the passage openings open, wherein the closing element is designed integral, wherein the closing element is connected to the actuator drive so as to be movable in a self-acting manner in a profile direction of the rotation axis (D) such that the closing element is rotatable about the rotation axis (D) by the actuator drive as well as displaceable in the self-acting manner in the profile direction of the rotation axis (D) in relation to the end side, and comprising a sensor for detecting a state variable (E) of the piston compressor valve, and comprising an actuating device which activates the actuator drive as a function of the state variable (E).

2. The valve as claimed in claim 1, wherein the sensor is designed for detecting a state variable (E) of the closing element, except the rotation angle of the closing element.

3. The valve as claimed in claim 1, wherein the closing element is connected to the actuator drive by way of a coupling that is resilient in the profile direction of the rotation axis (D).

4. The valve as claimed in claim 3, wherein the coupling is rotationally stable in relation to a rotation about the rotation axis (D).

5. The valve as claimed in claim 1, wherein the closing element is connected to the actuator drive by way of a shaft, and in that the shaft is mounted so as to be movable in the profile direction of the rotation axis (D) as well as in the rotation direction of the rotation axis (D).

6. The valve as claimed in claim 1, wherein the sensor is designed for detecting a movement of the closing element or of the shaft in the profile direction of the rotation axis (D) as the state variable (E).

7. The valve as claimed in claim 1, wherein the sensor is designed for detecting direct contact between the closing element and the valve seat as the state variable (E).

8. The valve as claimed in claim 1, wherein the sensor is designed for detecting a pressure differential over the closing element as the state variable (E).

9. The valve as claimed in claim 5, wherein the valve seat comprises a central bore, in that the passage openings run radially to the central bore, in that the central bore is designed as a radial bearing as well as an axial bearing in which the shaft is mounted so as to be rotatable and displaceable in the profile direction of the rotation axis (D), in that the closing element is fixedly connected to the shaft, and in that the shaft is connected to the actuator drive by way of the coupling.

10. The valve as claimed in claim 3, wherein the closing element is disposed between the valve seat and the resilient clutch so as to configure a pressure valve, or in that the valve seat is disposed between the closing element and the resilient coupling to form a suction valve.

11. The valve as claimed in claim 1, wherein the valve seat has passage openings which run so as to be radial to the rotation axis (D) and which in the circumferential direction to the rotation axis (D) has a width of at most 10° such that the closing element by way of a rotation of at most 10° about the rotation axis (D) is capable of being switched in a reciprocating manner between an open position and a closing position.

12. The valve as claimed in claim 1, wherein a torsion spring comprises an inner torsion spring as well as an outer torsion spring which are disposed so as to be concentric with the rotation axis (D) and which run in the profile direction of the rotation axis (D), in that the inner torsion spring at the first end thereof is connected to the actuator drive, in that the outer torsion spring at the first end thereof is connected to a housing part, in that the inner and the outer torsion springs at the second end thereof are connected to one another, and in that the torsion spring at the second end thereof is connected to the coupling or the shaft.

13. A method for actuating a piston compressor valve, wherein the piston compressor valve comprises a valve seat having a plurality of passage openings, a closing element that for opening and closing the passage openings is rotatable about a rotation axis (D), and an actuator drive for rotating the closing element, wherein the closing element is designed so as to be integral and fixedly connected to the rotation axis (D), wherein the rotation axis (D) is mounted so as to be displaceable in the profile direction of the rotation axis (D), wherein the closing element as a function of the pressure of an operating gas acting on the valve is displaced in a self-acting manner in the profile direction of the rotation axis (D) and bears on the valve seat or is lifted from the valve seat, wherein a state variable (E) of the piston compressor valve is measured, and wherein the closing element is rotated about the rotation axis (D) by the actuator drive as a function of the state variable (E).

14. The method as claimed in claim 13, wherein lifting of the closing element in the profile direction of the rotation axis (D) is measured as the state variable (E), and in that the closing element is rotated from a closed position to an open position when lifting is measured.

15. The method as claimed in claim 14, wherein the closing element is rotated from a closed position to an open position as soon as the lifting exceeds a predefined minimum distance ($D_{min}$).

16. The method as claimed in claim 15, wherein the spacing between a sealing face of the closing element and an end side of the valve seat is measured as the state variable (E), and in that the closing element is rotated from a closed position to an open position should the spacing exceed a minimum distance ($D_{min}$) of 0.1 mm.

17. The method as claimed in claim 13, wherein a pressure differential over the valve seat is measured as the state variable (E), and in that the closing element is rotated from a closed position to an open position should the pressure differential undershoot a predefined minimum pressure ($P_{min}$).

* * * * *